US010051025B2

(12) United States Patent
Hurst

(10) Patent No.: US 10,051,025 B2
(45) Date of Patent: Aug. 14, 2018

(54) METHOD AND APPARATUS FOR ESTIMATING PACKET LOSS

(71) Applicant: ECHOSTAR TECHNOLOGIES L.L.C., Englewood, CO (US)

(72) Inventor: Mark B. Hurst, Cedar Hills, UT (US)

(73) Assignee: DISH TECHNOLOGIES L.L.C., Englewood, CO (US)

( * ) Notice: Subject to any disclaimer, the term of this patent is extended or adjusted under 35 U.S.C. 154(b) by 232 days.

(21) Appl. No.: 14/145,375

(22) Filed: Dec. 31, 2013

(65) Prior Publication Data

US 2014/0189144 A1 Jul. 3, 2014

Related U.S. Application Data

(60) Provisional application No. 61/747,562, filed on Dec. 31, 2012.

(51) Int. Cl.
| | |
|---|---|
| *G06F 15/16* | (2006.01) |
| *H04L 29/06* | (2006.01) |
| *H04L 12/26* | (2006.01) |
| *H04L 12/24* | (2006.01) |

(52) U.S. Cl.
CPC .......... *H04L 65/60* (2013.01); *H04L 43/0829* (2013.01); *H04L 65/4084* (2013.01); *H04L 65/4092* (2013.01); *H04L 65/80* (2013.01); *H04L 41/147* (2013.01)

(58) Field of Classification Search
CPC .............................................. H04N 21/64707
See application file for complete search history.

(56) References Cited

U.S. PATENT DOCUMENTS

| | | |
|---|---|---|
| 5,935,206 A | 8/1999 | Dixon et al. |
| 6,195,680 B1 | 2/2001 | Goldszmidt et al. |
| 6,973,081 B1 | 12/2005 | Patel |
| 7,474,832 B2 | 1/2009 | Boston et al. |

(Continued)

FOREIGN PATENT DOCUMENTS

| | | |
|---|---|---|
| WO | 2007030813 A2 | 3/2007 |
| WO | 2009035466 A1 | 3/2009 |

(Continued)

OTHER PUBLICATIONS

Hohlfeld, et al. "Packet Loss in Real-Time Services: Markovian Models Generating QoE Impairments", IWQoS 2008, 16th International Workshop on Quality of Service, Jun. 2, 2008 [retrieved on Jul. 12, 2017]. pp. 239-248. Retrieved from: IEEE Xplore Digital Library, Inspec Accession No. 10068057.*

(Continued)

*Primary Examiner* — Kevin Bates
*Assistant Examiner* — Dae Kim
(74) *Attorney, Agent, or Firm* — Lorenz & Kopf LLP

(57) ABSTRACT

Methods, systems, and devices are described for estimating packet loss during media streaming over a data connection. A media player requests segments of an adaptive media stream and monitors variance in the amounts of data received. Increased variance in the amounts of data received can be directly correlated to a higher packet loss experienced by the data connection. The media player can use the estimated packet loss to adapt subsequent segment requests, or to otherwise subsequent behavior by the media player.

14 Claims, 6 Drawing Sheets

(56) References Cited

U.S. PATENT DOCUMENTS

Figure 1:
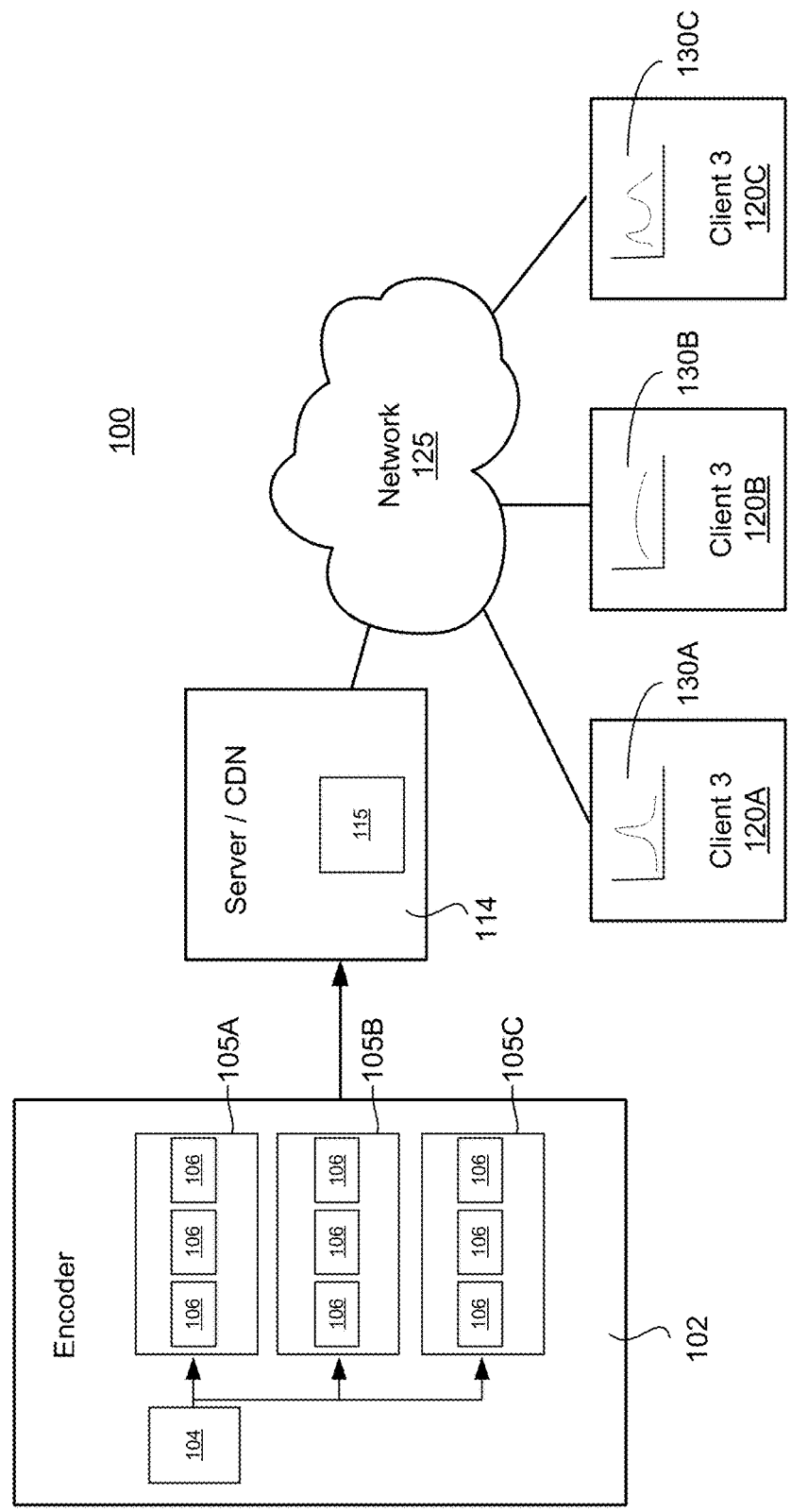

| | | |
|---|---|---|
| 7,584,495 B2 | 9/2009 | Hannuksela et al. |
| 7,603,022 B2 | 10/2009 | Putterman et al. |
| 7,624,412 B2 | 11/2009 | McEvilly et al. |
| 7,739,239 B1 | 6/2010 | Cormie et al. |
| 7,770,200 B2 | 8/2010 | Brooks et al. |
| 8,181,206 B2 | 5/2012 | Hasek |
| 8,238,725 B2 | 8/2012 | Demas et al. |
| 8,681,680 B2 | 3/2014 | Mao et al. |
| 8,787,975 B2 | 7/2014 | Kanojia et al. |
| 8,990,328 B1 | 3/2015 | Grigsby et al. |
| 2002/0046405 A1 | 4/2002 | Lahr |
| 2003/0208767 A1 | 11/2003 | Williamson et al. |
| 2005/0002337 A1 | 1/2005 | Wang et al. |
| 2005/0191033 A1 | 9/2005 | Ishido |
| 2005/0233694 A1 | 10/2005 | Enari et al. |
| 2005/0289618 A1 | 12/2005 | Hardin |
| 2006/0020984 A1 | 1/2006 | Ban et al. |
| 2006/0053078 A1 | 3/2006 | Yamamoto et al. |
| 2006/0117090 A1 | 6/2006 | Schellingerhout et al. |
| 2007/0036516 A1 | 2/2007 | Kahn et al. |
| 2007/0107019 A1 | 5/2007 | Romano et al. |
| 2007/0118857 A1 | 5/2007 | Chen et al. |
| 2007/0124245 A1 | 5/2007 | Sato et al. |
| 2008/0013919 A1 | 1/2008 | Boston et al. |
| 2008/0092168 A1 | 4/2008 | Logan et al. |
| 2008/0127284 A1 | 5/2008 | Kouniniotis |
| 2008/0201748 A1 | 8/2008 | Hasek et al. |
| 2008/0310825 A1 | 12/2008 | Fang et al. |
| 2008/0316936 A1* | 12/2008 | Enomoto ............ H04L 43/087 370/252 |
| 2009/0019178 A1* | 1/2009 | Melnyk ................ H04L 47/10 709/233 |
| 2009/0074380 A1 | 3/2009 | Boston et al. |
| 2009/0080582 A1 | 3/2009 | Loeffler et al. |
| 2009/0080864 A1 | 3/2009 | Rajakarunanayake |
| 2009/0144285 A1 | 6/2009 | Chatley et al. |
| 2010/0070858 A1 | 3/2010 | Morris et al. |
| 2010/0098176 A1* | 4/2010 | Liu ................... H04L 12/1868 375/259 |
| 2010/0114921 A1 | 5/2010 | Bocharov et al. |
| 2010/0153237 A1 | 6/2010 | LaJoie et al. |
| 2010/0226262 A1* | 9/2010 | Liu ................... H04N 21/2383 370/252 |
| 2010/0250549 A1 | 9/2010 | Muller et al. |
| 2010/0306655 A1 | 12/2010 | Mattingly et al. |
| 2010/0319044 A1 | 12/2010 | Agans et al. |
| 2011/0035507 A1 | 2/2011 | Brueck et al. |
| 2011/0083144 A1 | 4/2011 | Bocharov et al. |
| 2011/0138431 A1 | 6/2011 | Cedervall et al. |
| 2011/0173345 A1 | 7/2011 | Knox et al. |
| 2011/0179385 A1 | 7/2011 | Li et al. |
| 2011/0188439 A1 | 8/2011 | Mao et al. |
| 2011/0225315 A1 | 9/2011 | Wexler et al. |
| 2011/0296048 A1 | 12/2011 | Knox et al. |
| 2012/0054312 A1 | 3/2012 | Salinger |
| 2012/0079546 A1 | 3/2012 | Kalidindi et al. |
| 2012/0144302 A1 | 6/2012 | Campanotti et al. |
| 2012/0174157 A1 | 7/2012 | Stinson, III et al. |
| 2012/0265806 A1 | 10/2012 | Blanchflower et al. |
| 2012/0293605 A1 | 11/2012 | Seferian et al. |
| 2012/0317655 A1 | 12/2012 | Zhang et al. |
| 2012/0324489 A1 | 12/2012 | Greenfield |
| 2012/0331106 A1 | 12/2012 | Ramamurthy et al. |
| 2013/0003571 A1* | 1/2013 | Ochiai ................. H04L 1/0014 370/252 |
| 2013/0013688 A1 | 1/2013 | Wang et al. |
| 2013/0013704 A1 | 1/2013 | Pope et al. |
| 2013/0089142 A1 | 4/2013 | Begen et al. |
| 2013/0097309 A1 | 4/2013 | Ma et al. |
| 2013/0111606 A1 | 5/2013 | Gu |
| 2013/0142499 A1 | 6/2013 | Major et al. |
| 2013/0145392 A1 | 6/2013 | Major et al. |
| 2013/0145408 A1 | 6/2013 | Major et al. |
| 2013/0145410 A1 | 6/2013 | Major et al. |
| 2013/0145411 A1 | 6/2013 | Major et al. |
| 2013/0145415 A1 | 6/2013 | Major et al. |
| 2013/0159544 A1 | 6/2013 | Cooper |
| 2013/0254341 A1 | 9/2013 | Ramakrishnan |
| 2013/0254538 A1 | 9/2013 | Orsini et al. |
| 2014/0068690 A1* | 3/2014 | Luthra ............ H04N 21/23430 725/110 |
| 2014/0189099 A1 | 7/2014 | Hurst et al. |
| 2014/0189143 A1 | 7/2014 | Muhlestein |
| 2014/0237510 A1 | 8/2014 | Phillips et al. |
| 2014/0237534 A1 | 8/2014 | Salinger et al. |
| 2014/0250473 A1 | 9/2014 | Braness et al. |
| 2014/0317652 A1 | 10/2014 | Tam |

FOREIGN PATENT DOCUMENTS

| | | |
|---|---|---|
| WO | 2011034955 A2 | 3/2011 |
| WO | 2012153290 A1 | 11/2012 |

OTHER PUBLICATIONS

European Patent Office, International Search Report and Written Opinion, dated Apr. 17, 2014 for International Application No. PCt/US2013/078358.
Wikipedia, the free encyclopeida, Adaptive Bitrate Streaming, Sep. 24, 2014; retrieved from the Internet at http://en.wikipedia.org/w/index.php?title=Adaptie_bitrate_streaming@oldid=528192400.
USPTO, Notice of Allowance dated Mar. 4, 2014 for U.S. Appl. No. 13/707,031.
USPTO, Final Office Action dated Mar. 12, 2014 for U.S. Appl. No. 13/707,044.
USPTO, Final Office Action dated Mar. 13, 2014 for U.S. Appl. No. 13/707,022.
USPTO, Non-final Office Action dated Mar. 6, 2014 for U.S. Appl. No. 13/706,983.
USPTO, "Office Action" dated Aug. 21, 2014 for U.S. Appl. No. 13/706,993.
USPTO, "Notice of Allowance and Fee(s) Due" dated Aug. 25, 2014 for U.S. Appl. No. 13/706,983.
U.S. Patent and Trademark Office, Non-Final Office Action, dated Oct. 9, 2014 for U.S. Appl. No. 13/837,058.
U.S. Patent and Trademark Office, Non-Final Office Action, dated Nov. 3, 2014 for U.S. Appl. No. 13/707,008.
U.S. Patent and Trademark Office, Notice of Allowance, dated Nov. 6, 2014 for U.S. Appl. No. 13/706,983.
USPTO, Notice of Allowance and Fee(s) Due for U.S. Appl. No. 13/837,058 dated Feb. 3, 2015.
USPTO, Notice of Allowance and Fee(s) Due for U.S. Appl. No. 13/706,993 dated Feb. 27, 2015.
USPTO, Notice of Allowance and Fee(s) Due for U.S. Appl. No. 13/707,008 dated Mar. 4, 2015.
The International Bureau of WIPO, International Preliminary Report on Patentability for International Application No. PCT/US2013/078358 dated Jul. 9, 2015.
USPTO, Office Action for U.S. Appl. No. 14/145,115 dated Aug. 21, 2015.
U.S. Appl. No. 14/145,025, filed Dec. 31, 2013.
UPSTO, Office Action in U.S. Appl. No. 14/145,025 dated Nov. 5, 2015.
USPTO, Final Office Action in U.S. Appl. No. 14/144,235 dated Nov. 25, 2015.
Microsoft, How NTFS Works, Mar. 28, 2003, http://technet.microsoft.com/en-us/library/cc781134(v=ws.10).aspx.
T. Berners-Lee, "Hypertext Transfer Protocol—HTTP/1.1," Jun. 1999; retrieved from the Internet on Apr. 10, 2013 from http://www3.w3.org/protocols, Chapters 5, 6, and 10.
European Patent Office "International Search Report and Written Opinion" dated Jun. 7, 2013 for International Appln. No. PCT/US2012/067796.
US Patent and Trademark Office, Non-Final Office Action, dated Sep. 13, 2013 for U.S. Appl. No. 13/707,008.
US Patent and Trademark Office, Non-Final Office Action, dated Sep. 20, 2013 for U.S. Appl. No. 13/707,022.

(56) References Cited

OTHER PUBLICATIONS

US Patent and Trademark Office, Non-Final Office Action, dated Sep. 25, 2013 for U.S. Appl. No. 13/707,031.
US Patent and Trademark Office, Non-Final Office Action, dated Oct. 2, 2013 for U.S. Appl. No. 13/707,044.
US Patent and Trademark Office, Final Office Action dated Jan. 15, 2014 for U.S. Appl. No. 13/707,008.
US Patent and Trademark Office, Office Action dated Sep. 10, 2013 for U.S. Appl. No. 13/706,983.
US Patent and Trademark Office, Final Office Action dated Jan. 10, 2014 for U.S. Appl. No. 13/706,983.
U.S. Patent and Trademark Office, Notice of Allowance, dated May 23, 2014 for U.S. Appl. No. 13/707,044.
U.S. Patent and Trademark Office, Notice of Allowance, dated May 27, 2014 for U.S. Appl. No. 13/707,022.

* cited by examiner

FIG. 4

METHOD AND APPARATUS FOR ESTIMATING PACKET LOSS

CROSS-REFERENCE TO RELATED APPLICATIONS

This application claims priority to U.S. Prov. Pat. App. No. 61/747,562, filed Dec. 31, 2012, the entire contents of which are hereby incorporated by reference.

TECHNICAL FIELD

The present disclosure generally relates to streaming media content over a data connection such as the Internet. More particularly, the following discussion relates to systems, devices, and methods for estimating packet loss in a media player client while receiving a media stream over a data connection.

BACKGROUND

Media streaming is becoming an increasingly popular way of delivering television, movies and other media content to viewers. Media streams are typically point-to-point transmissions of digitized content that can be sent over the Internet or a similar network. Media streaming is often used to facilitate video on demand (VOD) services, remote storage digital video recorder (RSDVR) services, Internet Protocol television (IPTV) services, placeshifted media viewing and/or any number of other convenient services. Generally, the media stream is played back for the viewer in real time as the stream continues to be delivered to the player.

Often, media content is encoded into multiple sets of "streamlets" or other smaller segmented files that can be individually requested and adaptively delivered to a particular client device. As changes in network bandwidth or other factors occur, the client device is able to react to the changes by requesting future segments that are encoded with different parameters (e.g., a higher or lower bit rate). Several examples of adaptive streaming systems, devices and techniques are described in U.S. Patent Publication No. 2008/0195743, which is incorporated herein by reference.

Adaptive media streaming typically relies upon the media player client to control much of the streaming process. It is the media player client, rather than the server, that typically determines the next segment of the stream that will be requested and delivered to the player. While this player-centric approach provides adaptability to the particular conditions experienced by the player, the client is often limited in that it only has a limited amount of information that can be used to determine which segment should be requested next. If network congestion, server overload or other system-wide issues are occurring, the client device itself is typically not aware of these issues until they directly impact the stream of segments provided to that particular client device.

It is therefore desirable to create systems, devices and methods that allow the client device to better control the adaptive streaming process. These and other desirable features and characteristics will become apparent from the subsequent detailed description and the appended claims, taken in conjunction with the accompanying drawings and this background section.

BRIEF SUMMARY

Several examples of systems, devices and methods are described for estimating packet loss during media streaming. According to various embodiments, an intelligent media player client is able to accurately estimate the packet loss being experienced during a media streaming session by measuring the variance in the amount of data received during given time frame. If the same amount of data is being consistently read, then the rate of packet loss can be assumed to be relatively low. If the amount of data varies over time, however, then some packet loss is being experienced. By quantifying the variance in the amount of data being received, the media player is able to intelligently estimate the amount of packet loss, and to respond accordingly.

Alternate embodiments, aspects and other features are described in more detail herein.

BRIEF DESCRIPTION OF THE DRAWING FIGURES

Figure 2A:
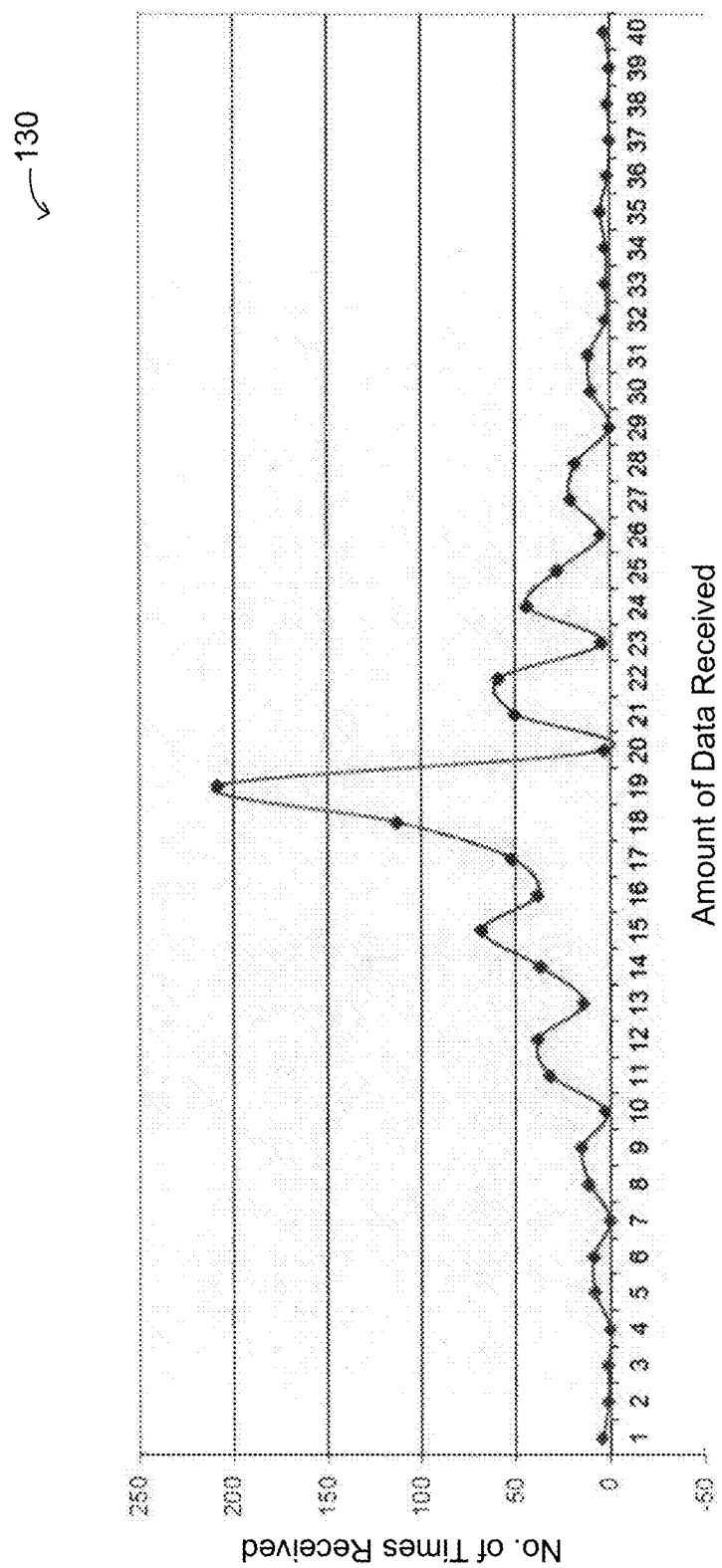
Figure 2B:
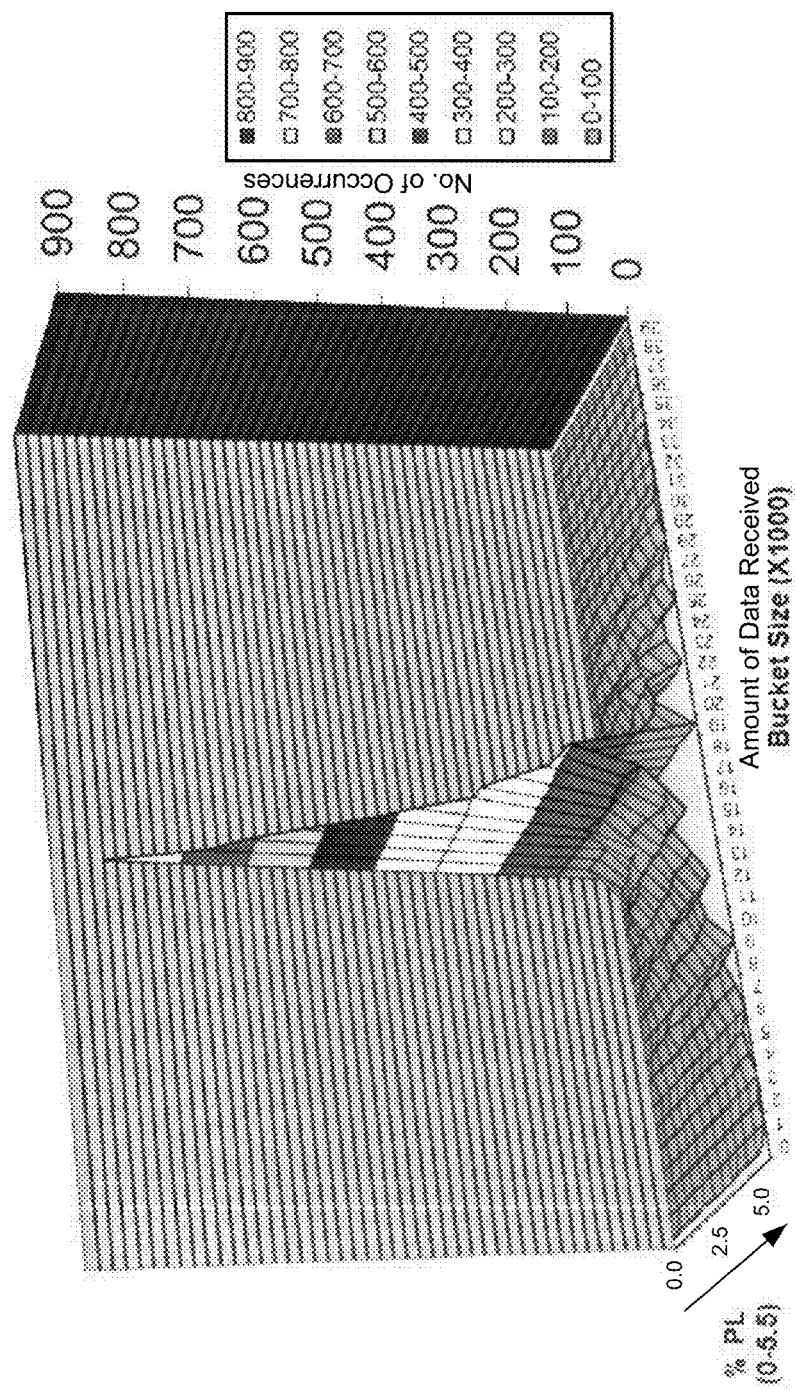
Figure 2C:
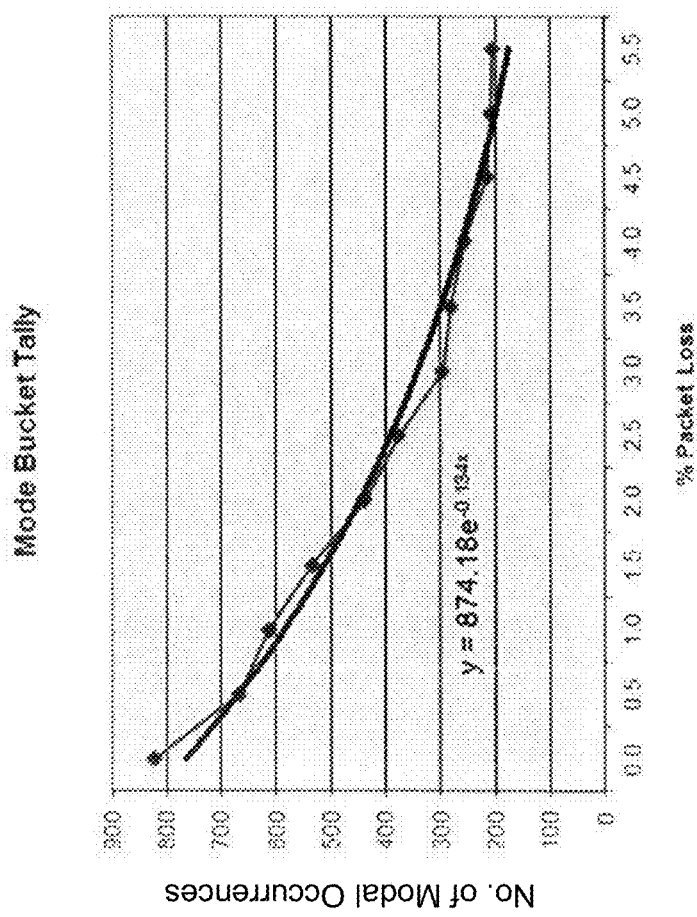
Figure 3:
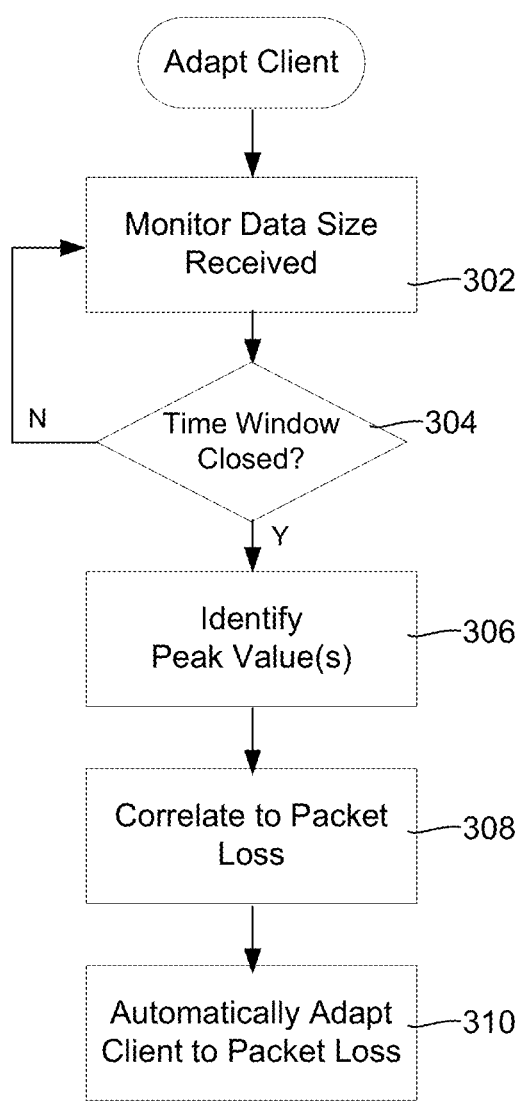

Exemplary embodiments will hereinafter be described in conjunction with the following drawing figures, wherein like numerals denote like elements, and FIG. 1 is a block diagram of an exemplary system for estimating packet loss during media streaming across a data network;

FIGS. 2A-C are plots showing examples of experimental data confirming that increased variance in received data amounts correlates to increased packet loss FIG. 3 is a flowchart of an exemplary process executable by a media player client device for determining packet loss in a media stream; and FIG. 4 is a table of exemplary experimental data.

DETAILED DESCRIPTION

The following detailed description of the invention is merely exemplary in nature and is not intended to limit the invention or the application and uses of the invention. Furthermore, there is no intention to be bound by any theory presented in the preceding background or the following detailed description.

As described above, it can be relatively difficult for a media player client device to quantitatively measure network performance during a media streaming session. Typically, the media player has little, if any, exposure to a broader media streaming system. It can therefore be relatively difficult to adapt the media player to react to changing conditions until such conditions adversely impact the experience for the user. It has been identified, however, that variance in the amount of data received during a media streaming session can be a good estimator of packet loss. Reliable, loss-free data connections tend to be relatively consistent in delivering data at the same rate over time. As packets are dropped by a router, server or other link in the data connection between the media server and the media client, however, the amount of data delivered during a particular time frame can vary more widely. By measuring the variance in received data amounts, then, the packet loss rate can be estimated. More particularly, increased variance in the amounts of data received during a particular time frame generally indicates increased data loss somewhere in the data delivery path.

The variance in data delivery can be tracked in any number of different ways. In an exemplary embodiment, the amount of data read during a particular time interval is tracked over a period of time that spans several time intervals. The amount of data received during each interval is recorded to create a virtual histogram, and the mode of the histogram is identified. Data loss may or may not affect the mode itself (i.e., the amount of data that is most often received), but it will generally have a measurable effect upon the number of times that the modal value occurs. Several examples below will make this concept clearer.

Turning now to the drawing figures and with initial reference to FIG. 1, an exemplary system 100 to adaptively deliver media streams to client devices 120A-C over a network 125 suitably includes an encoder 102 and a media server 114. The various components shown in FIG. 1 may be jointly provided by a common service provider, or different service providers may work together to provide different components of the system 100. A television network or other content provider could provide content that is already encoded in the appropriate formats, for example, thereby obviating the need for a separate encoder 102 in some implementations. Similarly, unicast and/or multicast hosting could be performed by any sort of content delivery network (CDN) or other service 114, as appropriate.

Encoder 102 is any device or service capable of encoding media programs 104 into one or more adaptive streams 105A-C. In the exemplary embodiment shown in FIG. 1, encoder 102 is a digital computer system that is programmed to create multiple streams 105A-C, each representing the same media program 104 in its entirety. Typically, each stream 105A-C is made up of smaller segments 106 that represent a small portion of the program in a single data file. Each stream 105A-C is typically encoded so that segments 106 of the different streams 105A-C are interchangeable with each other. That is, a client media player 120A-C can mix and match segments 106 from different streams 105A-C to continue seamless playback even as network conditions or other resources change.

Generally, the sets of segments 106 making up each stream 105 are stored on a content delivery network (CDN) or other server 114 for distribution on the Internet or another network 125. Typically, a media player application executing on one or more client devices 120A-C contains intelligent logic to select appropriate segments 106 as needed to obtain and playback the media program 104. As noted above, segments 106 may be interchangeable between streams 105 so that higher bandwidth segments 106 may be seamlessly intermixed with lower bandwidth segments 106 to reflect changing network or other conditions in delivery over network 125. In some implementations, the media player 120 initially obtains a digest or other description of the available segments so that the player itself can request the segments 106 as needed. Often, such requests can be processed using conventional hypertext transport protocol (HTTP) constructs that are readily routable on network 125 and that can be served by conventional CDN or other web-type servers 110. Although FIG. 1 shows only a single server 114, many implementations could spread streams 105 and/or segments 106 across any number of servers 114 for convenient delivery to clients 120A-C located throughout network 125.

Each client device 120A-C corresponds to any media player client capable of receiving streaming media content via network 125. In various embodiments, client devices 120A-C might be mobile phones or other portable devices, computer systems executing media player applications, tablet or notebook computers, video game players, media players, television receivers, video recorders and/or any number of other consumer-controlled devices. As stated above, each media player 120A-C typically executes its own media player software that is able to adaptively request segments 106 belonging to any of the different streams 105A-C associated with a program 104 that is being presented to the viewer.

To estimate packet loss, each client 120A-C suitably monitors the amounts of data received during a particular time interval. The client may measure data amounts received during an interval spanning 10-50 microseconds or so, to provide one example, although other embodiments may consider other intervals that are longer or shorter. If the data loss rate is relatively low, then the amount of data delivery will be relatively consistent across each time interval. That is, roughly the same amount of data should arrive during each time interval. As data loss occurs, however, each client device 120A-C will experience variation in the amounts of data received from interval to interval. By tracking the amounts of data received over various time intervals, then, variance and inconsistency can be identified and correlated to packet loss in the data connection.

To that end, each client 120A-C maintains data 130A-C (respectively) (in a database, datastore, or the like) that indicates quantities of data received over the past several time intervals. FIG. 1 shows this data 130A-C in histogram-type graphical format for ease of understanding. In practice, however, the data may be kept in numerical form in an array or other suitable data structure using conventional data processing techniques.

With momentary reference to FIG. 4, a table 400 of exemplary data is provided to show that packet loss correlates strongly to variations in the data. The particular values shown in FIG. 4, as well as the parameters used to obtain the values, are simply examples that could be adjusted in any number of equivalent embodiments.

Figure 4:
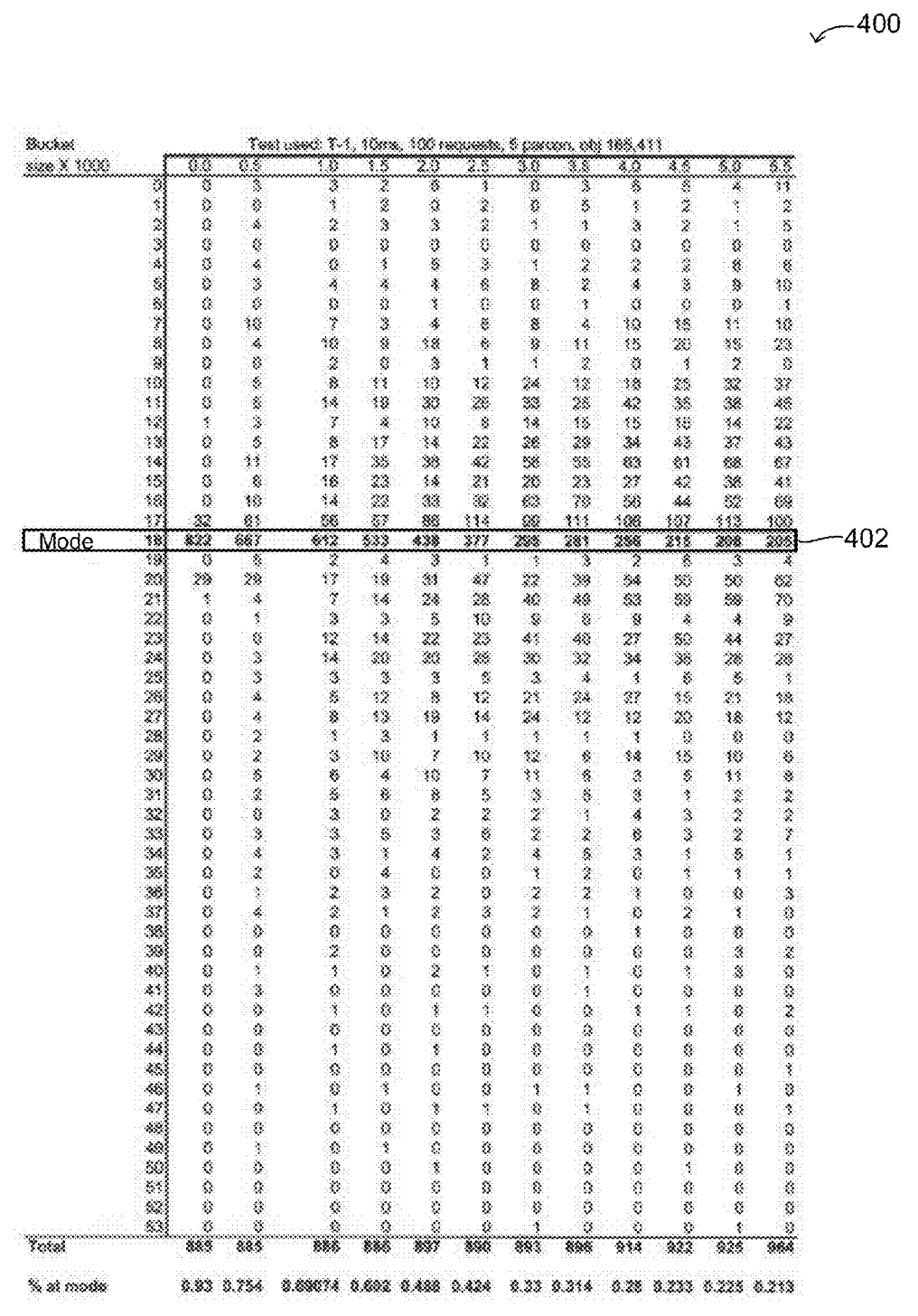

FIG. 4 shows twelve columns of experimental data corresponding to induced packet loss rates from 0.0 to 5.5 percent. The values in each column represent the number of times that a data-read operation having a duration of 10 milliseconds resulted in different amounts of received data. The "bucket size" parameter shown in the first column reflects the number of bytes received (×1000) during any particular toms read interval, and the numbers in the remaining columns represent the number of times that each data amount was received during a time interval.

As can be seen from FIG. 4, mode 402, for example, remained near 18,000 bytes even as packet rate increased. With zero packet loss, the modal amount of data was received 822 times out of 885 intervals, or about 93% of the time. With 5.5% packet loss, the mode remained at 18000 bytes, but the modal value only occurred 205 times in 964 intervals, or about 21% of the time. Further, the variation in amounts of data received increased greatly with packet loss. With no packet loss, the few intervals that did not fall at the modal amount still lay within a few thousand bytes of the mode. When 5.5% packet loss was introduced, however, the data amount per interval varied from 1000 bytes to 45000 bytes, with almost 80% of the data coming in an amount that differed from the modal amount. Again, the data values in the table are intended as non-limiting examples; practical applications may consider other time intervals, other "buckets" or time intervals, and other parameters as desired.

FIGS. 2A-C are based upon the data shown in FIG. 4, so these graphs should also be considered as examples that illustrate the concepts set forth herein. FIG. 2A graphically illustrates a histogram 130 of the data shown in the table of FIG. 4 for the 5.5% error rate. As can be seen from FIG. 2A, the histogram indicates a mode at about 18000 bytes received, with about 200 occurrences of the modal value.

FIG. 2B shows the various columns of FIG. 4 on a common plot, with the increasing "Z" axis indicating increased packet loss. As can be seen from FIG. 2B, increases in packet loss did not change the mode from 18000 bytes, but it did decrease the size of the modal peak from about 800 to about 200 for a comparable period of time. Stated another way, the variance in the data increased with packet loss so that more of the data was delivered in non-modal quantities. The decrease in the number of modal occurrences, then, correlates strongly with increased packet loss. The relationship observed between packet loss and the number of modal occurrences is graphically illustrated in FIG. 2C. Again, the values shown in graphs 2A-C are examples, and other embodiments may have very different values and parameters.

The various media player clients 120A-C in FIG. 1 can may estimate their packet loss rates by observing amounts of data received over time and recognizing the amount of variance in those amounts. One way to track the variance is to observe changes in the number of times that the modal value occurs. The sharper peak in histogram 130A experienced by client 120A in FIG. 1, then, corresponds to a relatively low packet loss rate, whereas the more gentle sloping curve of histogram 130B experienced by client 120B indicates a higher packet loss rate. The bi-modal histogram 130C experienced by client 120C could indicate jitter or other issues in the data connection to server 114. Various embodiments could detect bi-modal or other unusual distributions, and could adapt the media player function accordingly.

Turning now to FIG. 3, an exemplary process 300 is executable by the media player application or elsewhere in client device 120. The client device 120 is able to estimate packet loss on the data connection and/or adapt its behavior accordingly.

As noted above, the media player 120 monitors the amounts of data received (function 302) during each time interval (function 302). The time interval used in generating the example data in FIG. 4 was 10 milliseconds, although other embodiments may use other time periods as desired. In various embodiments, the time interval may be determined by the timing of the read function used to obtain stream data from the network interface. The number of time intervals considered (function 304) may similarly vary from a fraction of a second to a few seconds or more; in the example of FIG. 4, data was gathered over a window of about ten seconds. Other embodiments could use a sliding scale that considers that last minute (or the last few minutes) or so of data, as desired.

The example of FIG. 3 illustrates that a peak value could be identified (function 306) and correlated to the packet loss rate (function 308). This peak value could refer, for example, to the number of times that the modal amount of data was received, as described above. Other embodiments, however, could equivalently measure variance in received data rates using other metrics or values, as desired.

The peak value or other data could be correlated to data loss values in any manner (function 308). In various embodiments, the correlation is based upon experimental data, machine learning models, trial-and-error, and/or other techniques. In many implementations, it may not be necessary to quantify the network error; it may be sufficient to know that the error is relatively "high" or relatively "low", or simply that the error is increasing or decreasing from a prior level. The correlating function, then, may not involve literally determining a packet error rate or other network error measurement, but instead could involve taking an action of the media player or client device 120 that would be taken based upon network error.

To that end, the media player or another portion of client device 120 may adapt its behavior in response to the variation in the amounts of data received (function 310). Adaptions in behavior could vary from embodiment to embodiment and could include, without limitation, adapting the particular segments 106 that are requested from server 114 and/or requesting segments 106 from a different server 114 operating on network 125. If a particular server 114 is experiencing issues, for example, client device 120 may be able to avoid these issues by issuing future segment requests to a different server 114. Other implementations may simply request lower bandwidth segments 106 (e.g., segments 106 from streams 105 having lower bit rates, frame rates and/or resolutions) when the error rate increases. Higher bandwidth segments 106 could be conversely requested when error rates are observed to be relatively low. Various embodiments could decide whether to request higher or lower bandwidth segments 106 by comparing the observed data variance and/or error rate to predetermined threshold values, or by using other techniques.

The term "exemplary" is used herein to represent one example, instance or illustration that may have any number of alternates. Any implementation described herein as exemplary is not necessarily to be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of elements described without departing from the scope of the claims and their legal equivalents.

What is presently claimed is:

1. A method executable by a media player device to estimate the amount of packet loss in a data connection that delivers a media stream to the media player device, the method comprising:
   placing, over the data connection, requests from the media player device for segments of the media stream to be delivered to the media device;
   tracking a variance in an amount of data received in response to the requests;
   estimating, with a processor, the amount of packet loss in the data connection based upon the variance in the amount of data received in response to the requests; and
   adapting subsequent requests for segments of the media stream in response to the packet loss estimate;
   wherein estimating the amount of packet loss in the data connection includes correlating the packet loss to a peak value of the amount of data received during a predetermined plurality of time intervals, the peak value computed as the number of times that a modal amount of data is received within the predetermined plurality of time intervals.

2. The method of claim 1, wherein the adapting comprises requesting lower bandwidth segments when the packet loss increases.

3. The method of claim 2, wherein the adapting further includes requesting higher bandwidth segments when the variance in the amount of data received in response to the requests increases.

4. The method of claim 3, wherein the adapting further comprises requesting higher bandwidth segments when the variance in the amount of data received in response to the requests decreases.

5. The method of claim 1, wherein the estimated amount of packet loss is a value based on whether the packet loss is increasing or decreasing with respect to a prior value of the variance in the amount of data received.

6. A data processing system including a media player client configured to:
   place, over a data connection, requests from the media player device for segments of a media stream to be delivered to the media device;
   track, using a processor provided within the media player client, a variance in an amount of data received in response to the requests; and
   estimate, using the processor, the amount of packet loss in the data connection based upon the variance in the amount of data received in response to the requests; and
   adapting subsequent requests for segments of the media stream in response to the packet loss estimate;
   wherein estimating the amount of packet loss in the data connection includes correlating the packet loss to a peak value of the amount of data received during a predetermined plurality of time intervals, the peak value computed as the number of times that a modal amount of data is received within the predetermined plurality of time intervals.

7. The data processing system of claim 6, wherein the adapting comprises requesting lower bandwidth segments when the packet loss increases.

8. The data processing system of claim 7, wherein the adapting further includes requesting higher bandwidth segments when the variance in the amount of data received in response to the requests increases.

9. The data processing system of claim 8, wherein the adapting further comprises requesting higher bandwidth segments when the variance in the amount of data received in response to the requests decreases.

10. The data processing system of claim 6, wherein the estimated amount of packet loss is a value based on whether the packet loss is increasing or decreasing with respect to a prior value of the variance in the amount of data received.

11. A media player device comprising:
    a processor;
    a storage device; and
    a network interface;
    wherein the processor is configured to
        transmit requests for segments of a media stream over a network via the network interface;
        track a variance in an amount of data received in response to the requests;
        estimate the amount of packet loss in the data connection based upon the variance in the amount of data received in response to the request by correlating the packet loss to a peak value of the amount of data received during a predetermined plurality of time intervals, the peak value computed as the number of times that a modal amount of data is received within the predetermined plurality of time intervals; and
        adapt subsequent requests for segments of the media stream in response to the packet loss estimate.

12. The media player device of claim 11, wherein the adapting comprises requesting lower bandwidth segments when the packet loss increases.

13. The media player device of claim 12, wherein the adapting further includes requesting higher bandwidth segments when the variance in the amount of data received in response to the requests increases.

14. The media player device of claim 13, wherein the adapting further comprises requesting higher bandwidth segments when the variance in the amount of data received in response to the requests decreases.

* * * * *